(12) United States Patent
ten Brink et al.

(10) Patent No.: US 8,431,370 B2
(45) Date of Patent: Apr. 30, 2013

(54) ENZYMATIC MODIFICATION OF TRIGLYCERIDE FATS

(75) Inventors: Hilda Batsheva ten Brink, Englewood Cliffs, NJ (US); Eckhard Flöter, Vlaardingen (NL); Corrine Frances Lawrence, Vlaardingen (NL); Hindrik Huizinga, Vlaardingen (NL); Mattheus Adrianus Zuiderwijk, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 1788 days.

(21) Appl. No.: 10/587,477

(22) PCT Filed: Dec. 22, 2004

(86) PCT No.: PCT/EP2004/014772
§ 371 (c)(1),
(2), (4) Date: Jul. 26, 2006

(87) PCT Pub. No.: WO2005/071053
PCT Pub. Date: Aug. 4, 2005

(65) Prior Publication Data
US 2009/0246839 A1    Oct. 1, 2009

(30) Foreign Application Priority Data
Jan. 26, 2004   (EP) .................................... 04075249

(51) Int. Cl.
*C12P 7/62*   (2006.01)
(52) U.S. Cl.
USPC ........... 435/135; 435/134; 435/174; 435/198; 435/271
(58) Field of Classification Search ................. 435/134, 435/135, 174, 198, 271
See application file for complete search history.

(56) References Cited

U.S. PATENT DOCUMENTS 5,391,383 A * 2/1995 Sullivan et al. ................. 426/99
2003/0054509 A1 * 3/2003 Lee et al. ....................... 435/134

FOREIGN PATENT DOCUMENTS

EP   652 289      5/1995
WO   96/14756    5/1996

OTHER PUBLICATIONS

European Search Report on Application No. EP 04 07 5249 dated Jul. 1, 2004.
Berben et al., "*Interesterification with immobilized enzymes*", Society of Chemical Industry, 2001, XP002286715.
Nielsen, "*A Natural Vegetable Fat*", Oils and Fats International, vol. 18, No. 4, 2002, pp. 18-19, XP008025554.
Torres et al., "*Catalytic Transesterification of Corn Oil and Tristearin Using Immobilized Lipases from Thermomyces Lanuginosa*", JAOCS, vol. 79, No. 8, 2002, pp. 775-781, XP001124617.
Zhang et al., "*Production of Margarine Fats by Enzymatic Interesterification with Silica-Granulated Thermomyces lanuginose Lipase in a Large-Scale Study*", JAOCS, Vo. 78, No. 1, 2001, pp. 57-64, XP001182133.
Xu et al., "Production of Structured Lipids in a Packed-Bed Reactor with Thermomcyes lanuginosa Lipase", JAOCS, vol. 79, No. 6 (2002), pp. 561-565.
Xu, "Enzymatic production of structured lipids: Process reactions and acyl migration", Functional Foods/Processing, vol. 11, Oct. 2000, Inform.
Torres et al., "*Lipase-Mediated Acidolysis of Tristearin with CLA in a Packed-Bed Reactor: A Kinetic Study*", JAOCS, Vo. 79, No. 7, 2002, pp. 655-661, XP001182205.

\* cited by examiner

*Primary Examiner* — Allison Ford
*Assistant Examiner* — Susan E Fernandez
(74) *Attorney, Agent, or Firm* — Michael P. Aronson

(57) ABSTRACT

Process wherein the fatty acid residues on a glyceride moiety are randomised over the terminal and middle positions, wherein the process proceeds to a conversion degree on the terminal positions, Re, ranging from 0.3 to 0.95, and wherein a conversion degree on the middle position, Ra, ranges from 0.06 to 0.75, and wherein Ra is greater than 0.32Re-0.08, the process comprises the exposure of a triglyceride fat to a catalyst comprising a lipase wherein the lipase is a Thermomyces lanuginosa lipase which has an activity of at least 250 IUN corresponding to 22 g/(g*h) at the onset of the process.

16 Claims, 3 Drawing Sheets

ENZYMATIC MODIFICATION OF TRIGLYCERIDE FATS

FIELD OF THE INVENTION

The present invention relates to an interesterification process of triglyceride fats. More particularly the process concerns an enzymatic interesterification process which is further denoted as an enzymatic rearrangement process.

BACKGROUND

Chemical interesterification of a triglyceride fat aims at an exchange of the fatty acid residues of the glyceride moiety of the fat. After interesterification, on the resulting triglycerides the fatty acid residues have been exchanged by other residues. The fatty acid residues may originate from the same or from a different triglyceride molecules or they may come from free fatty acids which were present in the reaction mixture.

The exchange of fatty acid residues eventually results in a statistically random distribution of the fatty acid residues over the terminal and middle positions of the glyceride molecule. The obtained fat is said to have become fully randomised.

The chemical interesterification process needs a catalyst, which usually is an alkali metal hydroxide or an alkali metal alkanolate, such as sodium methanolate.

However, consumers increasingly prefer food and food ingredients which have not been exposed to chemicals during their preparation. Therefore a general need has arisen for non-chemical modification processes of triglyceride fats. Interesterification may also occur via enzymatic rearrangement. Such enzymatic process does not affect the naturalness of the fat.

Contrary to chemical interesterification which proceeds instantaneously, enzymatic rearrangement proceeds gradually, and therefore takes more time.

For enzymatic rearrangement (ER) a lipase enzyme is used as catalyst. Lipases used for ER comprise the microbial Mucor miehei lipase, Thermomyces lanuginosa lipase and Rhizopus oryzae (formerly Rhizopus delemar).

Generally, the lipases used in an ER process are sn-1 and sn-3 specific meaning that only the terminal fatty acid residues are effected.

In the course of the enzymatic reaction, some randomisation at the middle position may occur. However when this happens it is due to acylmigration (see Torres et al., JAOCS vol 79, no. 8 (2002) p 775-781, Torres et al JOACS, vol 79 no 7 (2002) p 655-661, and Zhang et al JAOCS vol 78, no. 1 (2001) p 57-64) which is a chemical side reaction which take place at long reaction times. The acylmigration is due to the presence of diacylglycerides which arise abundantly at long reactions times and in the presence of water.

This difference in randomisation results in triglyceride products with a triglyceride composition and with properties that are quite different from the fully randomised triglyceride fat resulting from chemical interesterification. Unfortunately, the extensive knowledge and experience acquired by using fully randomised chemically interesterified fats for manufacturing food products can not be used for enzymatically interesterified fats (Zhang et al JAOCS, Vol. 78, no 1 (2001) pp. 57-64).

Furthermore the middle position in a natural feedstock fat is usually is an unsaturated fatty acid, often oleic acid. Triglycerides of the type palmitic-oleic-palmitic may cause graininess in the fat blend. Because the middle position of the triglycerides in an enzymatic rearrangement reaction is hardly affected, triglycerides with a saturated middle position are barely present in enzymatically rearranged fats, unless already present in the starting material. This typical distribution of natural fatty acids over the triacyglycerides has some consequences. In the first place it is nutritionally beneficial to have an unsaturated fatty acid at the middle position, since the lipase activity in our digestive system delivers a 2-monoacylgyceride and 2 free fatty acids which are derived from the terminal triacylglycerides positions. This digestive effect is confirmed by Nielsen (Oils and fats international (vol 18, no 4 (2002)). He established that immobilised Lipozyme TL IM action is restricted to the 1 and 3 position on the triglyceride, leaving the middle position unaltered. However, this configuration of fatty acids over the glycerol backbone of the triacylglycerides also has a downside. With respect to food structuring functionality these triacylglycerides, with a unsaturated middle position, are less functional. This is due to their lower melting point compared to fully saturated triacylglycerides and their complicated crystallisation behaviour.

As explained before, rearrangement on the middle position may occur during enzymatic rearrangement, however in order to occur at a appreciable amount the enzymatic rearrangement has to proceed at equilibrium (100% conversion of sn1 and sn-3 position) or beyond. Chemical rearrangement proceeds instantly, meaning that instantly a complete randomisation is obtained. It is the nature of the enzymatic reaction that in the beginning of the reaction the conversion of sn-1 and sn3 position runs quickly, but that towards equilibrium the conversion rate proceeds more and more slowly (see FIG. 1). Consequently, to attain 100% conversion long enzyme contact times are needed.

The enzymatic re-arrangement process, even though strictly sn-1 and sn-3 specific, is always accompanied by a some change of the fatty acid distribution on the sn-2 position. This is due to the unavoidable chemical process of acylmigration that occurs in partial fatty acid glycerides. Xu et al (Enzymatic Production of Structured lipids: Process reactions and Acyl migration, inform 11 (2000) p 1121-1131) reported that acylmigration can be attributed primarily to longer residence times. However, the related low flow through the packed bed reactor makes the process expensive for use on industrial scale. (Xu et al JAOCS, Vol. 79, no 6 (2002) pp. 561-565). Indeed, Torres et al. recommend short reaction times to reduce randomisation of the fatty acids residues (JOACS, vol 79, no 8 (2002) p 775-781).

Without wishing to be bound by theory the process of acylmigration is independent on the enzyme used, however it is due to the relatively slow rate of the process. Significant effect on the middle position only occur at very high conversion rates, often 100%, which relates to very long contact times. This is illustrated by FIG. 3.

The processes reported in the prior art typically refer to time and enzyme concentration combinations that relate to 100% conversion of the sn-1 and sn-3 position (equilibrium) and often in excess of the time needed to obtain 100% conversion on the terminal positions. As a logical consequence these reactions yield also a certain amount of randomisation of the middle position. However, these processes are economically not attractive, because of the long contact times needed to obtain a reasonable amount of sn-2 randomisation.

For example Berben et al in society of chemical industry (online 16 Feb. 2001) describe a process of enzymatic rearrangement wherein they have the reaction proceed until equilibrium and obtain a randomisation on the middle position of 18%.

WO96/14756 describes ER of fat blends using sn-1 and sn-3-specific SP392 as lipase catalyst. The process is characterised in that the rearrangement does not proceed beyond a conversion degree of the sn-1 and sn-3 position of 90% (but being at least 20%), which results in shorter reaction times. However, no randomisation at the sn-2 position is observed.

Some rare lipases including *Candida cylindracae* and *Arthrobacter* lipases are non-specific. An ER process using those lipases delivers a fat rearranged at all glyceride positions. However, those lipases either have been found to be not suited for use at an industrial scale and/or have not been approved for food manufacture.

The process described in EP 652289 uses a common sn-1 and sn-3-specific lipase. The rearrangement requires the presence of a substantial amount of at least 4 wt. % of diacylglycerides (also denoted as diglycerides) in the reaction mixture. The fat becomes rearranged at all three positions, but at the end it contains much diglycerides and other byproducts, all of which need to be removed by a subsequent purification process.

A cost effective ER process is needed which results in substantial rearrangement also at the middle position. Such a process would make a new range of naturally modified triglyceride fats economically available.

It is therefore an object of the present invention to provide an enzymatic rearrangement process wherein an appreciable amount of rearrangement on the middle position occurs. A further object of the invention is a process with a short reaction time. Another object of the invention is to provide an enzymatic rearrangement process without the deliberate use of diacylglycerides.

Surprisingly one or more of the above mentioned objects is obtained by using a catalyst with an activity exceeding 250 IUN (22 g/(g*h)) as measured at the onset of the process.

DETAILED DESCRIPTION OF THE INVENTION

Figure 1:
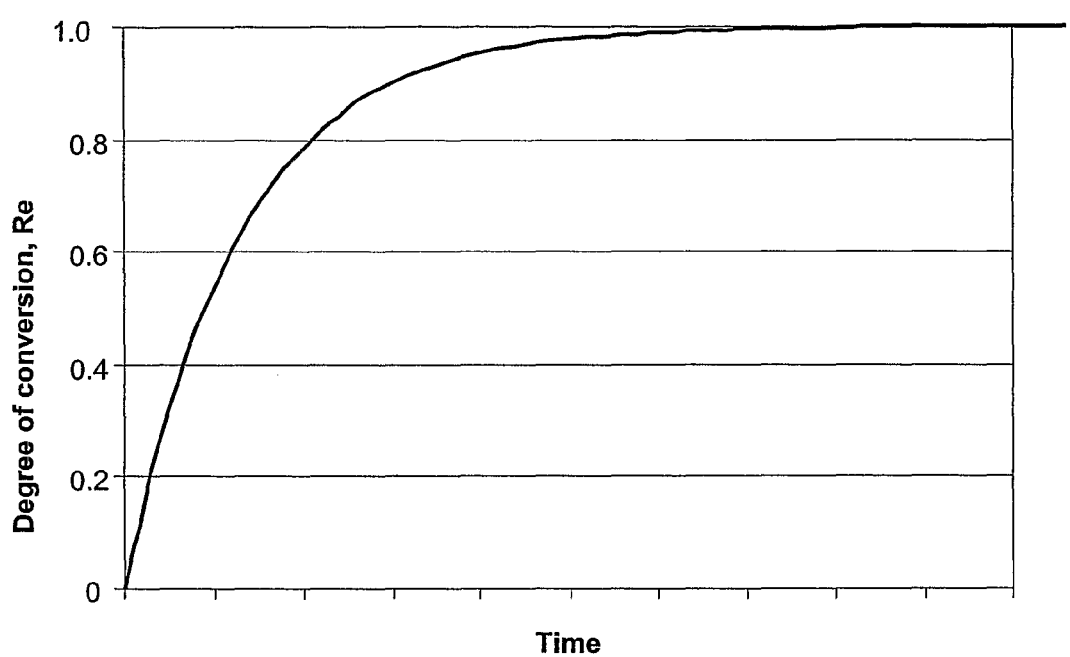
FIG. 1: plot of conversion degree Re vs time.

The present invention relates to a rearrangement process wherein the fatty acid residues on a glyceride moiety are randomised over the terminal and middle positions, wherein the process proceeds to a conversion degree on the terminal positions, Re, ranging from 0.3-0.95, and wherein a conversion degree on the middle position, Ra, ranges from 0.06-0.75, and wherein Ra is greater than 0.32Re-0.08, the process comprises the exposure of a triglyceride fat to a catalyst comprising a lipase characterised in that the lipase is a Thermomyces lanuginosa lipase which has an activity of at least 250 IUN corresponding to 22 g/(g*h) at the onset of the process.

The IUN is a measure of the activity of the enzyme and is determined according to the procedure as described below in the experimental section.

The activity of the enzyme can also be measured with an other, more convenient method. The method measure the amount of oil converted per amount of catalyst in one hour (g/(g*h)). An activity of 250 IUN corresponds to 22 g/(g*h). The method is described in the experimental section.

The invented process has the benefit over prior art enzymatic rearrangement processes that it provides an appreciable amount of rearrangement at the middle position of the triglycerides, it does not need an excess of diacylglycerides and therefore does not need a cumbersome purification step at the end. In addition, the process of the invention has short contact times.

Conversion degree Re is the actual conversion over the sn-1 and sn-3 position. It is the conversion degree at a certain time divided by the equilibrium state (100% conversion of sn-1 and sn-3 position). Conversion degree is the actual conversion on the sn-2-position only. It is the conversion of the sn-2 position at a certain time divided by the equilibrium state at the sn-2-position which is identical to the sn-2 fatty acid distribution of chemically interesterified mixture. Determination of the conversion degree Re and Ra of a rearranged fat sample is based either on the change of its carbon number profile or on the change in molar fractions of specific types of triglycerides. The measurements are explained in the experimental section.

The process of the present invention is such that even before attaining equilibrium with respect to sn-1 and sn-3 randomisation (Re=1), a substantial randomisation of the middle position (Ra) is achieved, ranging from 0.06-0.75. The process of the present invention does therefore not proceed further than a conversion degree Re of 0.95. This allows short residence time such as described in WO96/14756.

The processes of the prior art proceed until equilibrium or beyond see e.g. Berben et al in society of chemical industry (online 16 Feb. 2001), Torres et al., JAOCS vol 79, no. 8 (2002) p 775-781, Torres et al JOACS, vol 79 no 7 (2002) p 655-661, and Zhang et al JAOCS vol 78, no. 1 (2001) p 57-64.

With the process of the present invention long contact time and long reaction times which belong to the processes of the prior art, are avoided.

In addition, even at short contact times, i.e. low Re conversion degree, already a minimum randomisation at the sn-2-position occurs. For Re between 0.3 and 0.95, the rearrangement on the middle position (Ra) is greater than 0.32Re-0.08. Preferably Ra is at least 0.32Re-0.06 and even more preferably Ra is at least 0.32Re-0.04.

Preferably the conversion degree Re is less than 0.9, more preferably less than 0.85.

The conversion degree Re is preferably at least 0.35, and even more preferably at least 0.4.

The supplier of Lipozyme® TL IM recommends a flow of 1500 kg oil per hour per 400 kg catalyst in a packed bed reactor. This results in residence time of 32 minutes. A general description of this process can also be found in Nielsen, Oils and Fat international, vol 18, no 4 (2002).

In contrast the present invention where the enzyme has an activity of at least 250 IUN corresponding to 22 g/(g*h), allows processing of 4400 kg oil per hour employing the same amount of enzyme resulting in a residence time of only 11 minutes. However, still a substantial amount of randomisation at the middle position occurs.

Figure 2:
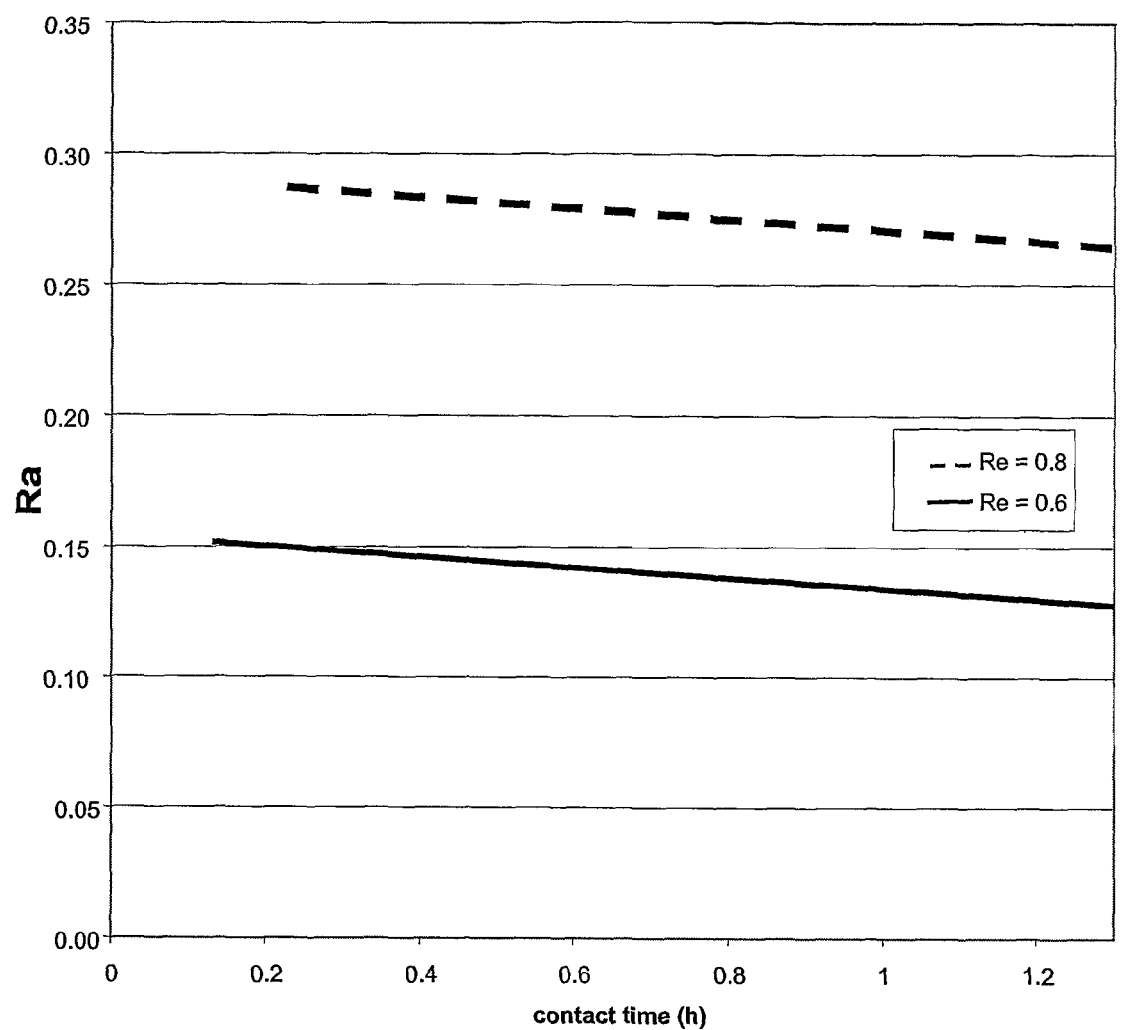
FIG. 2: plot of randomisation on 2-position (Ra) versus contact time.

Suitably during the first hour of conducting oil through a packed bed reactor the residence time of the oil in the Lipozyme® TL IM catalyst bed of the present invention preferably is less than 25 min, more preferably less than 20 min and still more preferably less than 15 min. These residence times are the residence times in the beginning of the rearrangement when fresh catalyst is present. In the course of the process the catalyst gradually looses activity and longer residence times are needed for the maintenance of the degree of conversion Re. Longer residence times may be accomplished by reducing the flow of the oil through the catalyst bed reactor. For the present invention, even when the activity of the catalyst in the course of the reaction is reduced, and the flow is adjusted, still the randomisation of the sn-2-position is at an appreciable rate (see FIG. 2).

The present invention may also be used in a batch process. However instead of short residence time or high oil flow, low concentrations of a catalyst may be used. In comparison with prior art processes where the concentration of the catalyst is 10 wt. %, the catalyst concentration of the present invention in a batch process may range from 0.05-9 wt. %, more preferably from 0.05-5 wt. % and still more preferably 0.05-3 wt. % calculated on the reaction mixture.

The present process preferably uses the Thermomyces lanuginosa lipase containing ER catalyst Lipozyme® TL IM which is commercially available from NOVOZYMES, Denmark, as an aggregate of enzyme and silica. The IUN catalyst activity is defined by its method for measuring by NOVOZYMES, as described below in the experimental section. Alternatively the activity can be measured by another more convenient activity measurement which is also described in the experimental section.

In the art of enzymatic rearrangement the presence of silica is reported to catalyse randomisation of the middle position. Without wishing to be bound to theory, it is thought that silica retains water and that water hydrolyses the triglycerides to diacylglycerides which catalyse rearrangement at the sn-2-position. So, in the processes of the prior art, more silica leads to more diacylglycerides, which leads to more sn-2-randomisation. However, when using the highly active lipase according to the present invention, it was surprisingly found that less silica leads to a increase of randomisation at the middle position.

An economy related benefit of the present process is that it does not need the cumbersome final purification from diglycerides as is necessary for the process of EP 652289.

From the prior art the Lipozyme® TL IM catalyst is dispensed with water and then added to the reaction mixture. The present process however, is preferably carried out with relatively low content of water. Preferably the amount of water is in the range 0.001-0.1 wt. %, more preferably in the range of 0.001-0.05 wt. %.

Water content measurement is determined by means of standard Karl Fischer titration, but not earlier than 30 minutes after contacting the catalyst with the feedstock in a batch reactor. When processing in a packed bed reactor, water measurement is done in an oil sample taken downstream of the reactor but not earlier than 30 minutes after the oil has started to flow through the catalyst bed in order to allow for reliable measurements.

Suitably the temperature of the reaction mixture is from 40 to 85° C., preferably from 45 to 80° C., more preferably from 50 to 75° C.

The process of the invention may be applied to a variety of triglyceride fat blends, but is most appropriate for triglyceride fat blends in which there is a difference in the distribution of fatty acids over the sn-1, sn-3 and sn-2 position of the glyceride molecule.

The process of the present invention is particularly suitable for a feedstock comprising
   any mixture comprising of a liquid oil and a hydrogenated oil, preferably the hydrogenated oil is fully hydrogenated as that leads to no trans fatty acids, or
   any triglyceride fat which has not been subjected to hydrogenation, or,
   a mixture of palm fat or a palm fat fraction and a lauric fat or a lauric fat fraction.

The mixture of palm fat or a palm fat fraction and a lauric fat or a lauric fat fraction is preferred.

The invention also comprises the use of an aggregate of Thermomyces lanuginosa lipase and silica as catalyst for partially rearranging fatty acid residues of a triglyceride fat to a conversion degree of the terminal positions Re of 0.3 to 0.95, comprising a rearrangement on the middle position to a conversion degree Ra of 0.06 to 0.75, wherein the lipase/silica aggregate has an activity of at least 250 IUN (22 g/(g*h)), preferably at least 300 IUN (25.5 g/(g*h)), more preferably at least 350 IUN (29 g/(g*h)).

The invention also comprises a triglyceride fat obtainable by enzymatic rearrangement of which the conversion degree of the terminal positions Re is from 0.3 to 0.95 and of which the conversion degree of the middle position of the triglyceride Ra is from 0.06 to 0.75, while Ra is greater than 0.32Re-0.08, preferably greater than 0.32Re-0.06, more preferably greater than 0.32Re-0.04.

Because the enzymatic rearrangement process of the present invention is different from the often used chemical interesterification and the enzymatic conversion process proceeding to 100% conversion at the sn-1 and sn-3 position, the fats resulting from the enzymatic rearrangement process of the present invention have different properties than those obtained by the conventional chemical interesterification and the enzymatic conversion process proceeding to 100% conversion on the sn-1 and sn-3 position (like Berben et al in society of chemical industry (online 16 Feb. 2001), Nielsen, Oils and Fat international, vol 18, no 4 (2002), Torres et al., JAOCS vol 79, no. 8 (2002) p 775-781, Torres et al JOACS, vol 79 no 7 (2002) p 655-661, and Zhang et al JAOCS vol 78, no. 1 (2001) p 57-64).

Preferably the triglyceride fat is obtained by enzymatic rearrangement of which the conversion degree of the terminal positions Re is less than 0.9, preferably less than 0.85. Preferably the conversion degree Re is at least 0.35, preferably at least 0.4.

Fats according to the invention are suitable for the preparation of food compositions, particularly for the preparation of a constituting fat phase which comprises a liquid oil and a structuring fat. Such fat phases are widely used for the preparation of fat continuous emulsions used in the manufacture of e.g. spreads.

Because an enzymatic rearrangement process qualifies as natural, those fats too may be qualified as natural.

The process according to the invention allows the production of fats enriched with triglycerides which have a saturated fatty acid residue on the middle position. Such fats are used in food applications where the crystallisation behaviour of the lipid phase is critical for end product quality. Said triacylglycerides strongly influence both stability of the end products against adverse temperature conditions and crystallisation related process parameters based on the intrinsic crystallisation properties of the fat.

So the process according to the invention allows the production of fats like the ones in EP 831711 with low graininess despite having a high palmitic acid content. Although the feedstock is a blend with palm oil or a palm oil fraction, the rearranged fat phase does not cause graininess in fat continuous emulsion spreads prepared with such fat phase, or at least the graininess is substantially reduced.

The invention also comprises the food products in which a fat is incorporated which is obtained by the process of the present invention.

The present invention has the benefit over the prior art enzymatic rearrangement processes that it has much shorter reaction time, thus allowing an economically feasible process. Furthermore a substantial amount of randomisation on the sn-2-position is possible with the process of the invention, while still keeping the naturalness of the fat. In addition, because there is already a substantial amount of randomisation of the middle position at short reaction time and low conversion degree on the sn-1 and sn-3 position, the rearrangement process can be stopped at various times, resulting in fats with different properties. One may choose the conversion degree, Re and Ra, by stopping the reaction at a certain time and thereby fine-tuning the property of the obtained fat.

Experimental Section
Determination of Residence Time

Residence time in hours is determined by taking the volume of the catalyst bed inclusive oil, subtracting the volume of the catalyst and dividing the difference by the volume of oil passing the bed in one hour.

Establishing the IUN Activity of Lipase Catalyst

1. Principle

The method is provided by the catalyst supplier and is based on interesterification of triglycerides by an immobilised lipase. The conversion of tristearin in a substrate composed of 27 w/w % fully hydrogenated soy bean oil and 73 w/w % refined, bleached and deodorized soy bean oil at 70° C. and 200 rpm stirring is used to quantify the activity of the catalyst. The concentration of tristearin is determined using an HPLC based analytical method.

2. Specificity and Sensitivity

Components having the same retention time as tristearin in the chromatographic method used will cause an overestimation of the tristearin concentration.

3. Definition of Units

The interesterification activity is defined as the initial conversion rate for tristearin at standard conditions. 1 IUN corresponds to a conversion rate of 0.01 g tristearin/l /minute/gram catalyst.

4. Apparatus

Analytical Balance
Shaker Water Bath

| | |
|---|---|
| Pipettes | Positive displacement pipette for taking oil samples (due to high viscosity of the liquid). Standard pipettes (e.g. Finnpipette) for the other steps in the analysis. |

HPLC system including the following modules: HPLC pump, injection system and column heater.
Light scattering detector, e.g. Sedex 55.
HPLC Column RP 18e (5 µm), LiChroCart 250-4.
Data acquisition Data can be acquired and processed using chromatography software.

Analytical Conditions

| | |
|---|---|
| Column temp.: | 40° C. |
| Flow: | 1.5 mL/min. |
| Mobile phase: | The mobile phase consists of 50 v/v % acetonitrile, HPLC grade and 50 v/v % dichloromethane, HPLC grade. |
| Injection volume: | 20 µL. |
| Run time: | At least 11 minutes. |
| Column temperature: | 40° C. (±2° C.) |
| Detector: | 40° C. (±2° C.), nitrogen pressure 2.3 bar. |
| Detector sensitivity: | Gain 6 |

5. Reagents and Substrates
Chemicals
Tristearin. SIGMA grade, Approx. 99%

Solutions
Substrate (20 grams):
27 w/w % fully hydrogenated soy bean oil (delivered by ADM, Illinois, USA)
73 w/w % refined, bleached and deodorised soy bean oil (delivered by ADM, Illinois, USA)
Catalyst (2 gram): The samples are conditioned at $a_w$=0.3 for at least 24 hours.

6. Samples and Standards

Standards
A standard curve of tristearin is made in the concentration range from 0.25 to 2.0 mg/ml.

Level Control
Reference sample: Lipozyme® TL IM reference PPW6503-3, particle size fraction 425-500 µm, is used (single determination).

7. Procedure

As substrate a blend of 27 w/w % fully hydrogenated soy bean oil (FH SBO) and 73 w/w % refined, bleached and deodorised soy bean oil (RBD SBO) is made. The oil mixture is heated to 80° C. in a water bath, and is well mixed.

The oil mixture is weighed out in 100 ml conical flask with a screw top wail, about 20 grams in each. The precise weight is notated with 2 decimals. The flasks (batches) are placed in the shaker water bath at 70° C. and 200 rpm.

A catalyst amount corresponding to approx. 10% of the amount of oil is weighted out (approx. 2 grams). The precise weight of the catalyst is determined with 2 decimals.

When the oil mixture is homogeneous, a time zero-sample is taken. 100 µl of the oil is taken with a positive displacement pipette (Gilson microman). The pipette tip is wiped off by a Kleenex to remove outside oil mixture and the sample is deposited in a HPLC vial (type BROWN 12×32 mm with Silicone/PTFE Septa).

The weighed amount of catalyst is added to the flasks containing the oil mixture and samples are taken to the times: 15, 30, 45 and 60 minutes. All samples are 100 µl. The samples are stored in a freezer until HPLC analysis.

The samples in the HPLC vials are diluted with 900 µl dichloromethane. This solution is mixed on a whirl-mixer, before a further dilution of 100 µl to 900 µl dichloromethane is made (total dilution of 100×). After a further mixing this sample is being analysed by HPLC.

The diluted samples are analysed by HPLC-ELSD.

The response versus concentration of the tristearin standards are fitted to an exponential model.

8. Calculation

The concentration of tristearin in the samples is calculated by use of the standard curve.

The conversion of (the decrease in) tristearin concentration versus time is fitted to a exponential model, by non linear parameter estimation. The model is:

$$C_{Tristearin}(t) = C_{0,est} \cdot \exp(-k_{est} \cdot t)$$

Where $C_{tristearin}(t)$=is the concentration of tristearin in the reaction mixture at time, t.

$C_{0,est}$=start concentration of tristearin (estimated parameter)

$k_{est}$=rate constant (estimated parameter)

t=reaction time

From the estimated rate constant, $k_{est}$, the activity at standard conditions, the IUN activity, can be calculated according to the following formula:

$$IUN/g = k_{est} \cdot C_{0,std} \cdot 100 \cdot \frac{W_{std}}{W} \cdot \frac{M_{oil}}{M_{oil,std}}$$

$C_{0,std}$=start concentration of tristearin at standard condition.
$W_{std}$=weight of catalyst under standard conditions (2 g)
W=actual weight of catalyst
$M_{oil}$=actual weight of oil
$M_{oil,std}$=weight of oil under standard conditions (20 g)
Determination of Activity in g/(g*h)
Calculating Activity
Substrates:

50 g refined bleached and deodorised quality dry fractionated palm stearin fraction mp 53

50 g refined bleached and deodorised quality palm kernel oil an amount of immobilised enzyme catalyst such that a conversion degree Re between 0.2 and 0.4 is obtained at approximately one hour. Some experiments with different amounts of enzyme is usually sufficient to find the right amount of enzyme. For an enzyme with an activity of 455 IUN/38 g/(g*h) a conversion degree Re between 0.2 and 0.4 is obtained at approximately 1 hour with an amount of 1 wt %.
Procedure:

The two oils are mixed together well in a closed 100 ml reaction vessel and brought to 70° C. under agitation. The enzyme catalyst is added to the oil substrate and the mixture agitated at 70° C. A sample of oil is taken after 1 hour, ensuring that no enzyme catalyst is present, and then every hour until the reaction is at equilibrium.

A plot is made of conversion degree Re against time as shown in FIG. 1.

The activity is then determined according to the following equation:

$$\text{Activity} = -\ln(1-x) * \frac{\text{amount of oil (g)}}{(\text{amount } cat \text{ (g)} * t(h))}$$

where,
x is the conversion degree, Re (determined as described) and is a point after approximately 1 hour when Re is between 0.2 and Re=0.4. However Re should never be above 0.4.
t is the time
the amount of oil and catalyst is in grams, and are known parameters.
Care should be taken that the point x is taken on the linear part of the curve and not too close to the starting point.
Determination of Re and Ra Determination of the conversion degree Re of a rearranged fat sample is based either on the change of its carbon number profile or on the change in molar fractions of specific types of triglycerides. The determination proceeds as follows:

For a to be rearranged fat sample the overall fatty acids composition, the composition of fatty acids on the middle position and the triglyceride composition is analysed. Common analysis methods are used comprising FAME-analysis, the GLC/carbon number method and the HPLC/silver phase method as are described in for example EP 78568, EP 652289, JAOCS, (1991), 68(5), 289-293 and Hammond E. W. J., Chromatography, 203, 397, 1981.

The molar fraction ($pA_{sn1,3}$) of any specific fatty acid residue (A) on a terminal position (either the sn-1 or the sn-3 position, which positions are assumed to be identical) is calculated according to the following formula:

$$pA_{sn1,3}=(3*pA_{total}-1*pAS_{sn2})/2$$

where $pA_{total}$ denotes the total occurrence of a particular fatty acid residue A in the fat blend and $pA_{sn2}$ the occurrence at the 2-position of fatty acid residue A situated. For all occurring fatty acid residues having a molar fraction larger than 0.002 the value $pA_{sn1,3}$ is established. The distribution of these molar fractions should be normalized to 1.0.

The triacylglyceride profile of a fully randomised triglyceride fat is calculated by simple statistics known to the man skilled in the art. The mole fraction p(ABB) of the triacylglyceride ABB, for example, is calculated using the formula:
$p(ABB)=2*pA_{sn1,3}*pB_{sn2}*pB_{sn1,3}$ Generally, the carbon number of a specific triglyceride molecule is the total number of carbon atoms on its three fatty acid residues. The carbon number profile of a particular fat blend consists of the occurrence percentages of all carbon numbers of that fat blend.

The carbon number profile of a fat blend is derived from its triacylglyceride composition (the mole fraction collection of all triacylglycerides).

From the triacylglycerol profile of the fat blend the carbon number profile can be derived easily.

By analysis the carbon number profile is established for the starting fat blend and for a specific partially rearranged sample taken from a reaction mixture. The carbon number profile of the theoretically sn-1 and sn-3 fully randomised fat blend is found by a statistical calculation of the triglycerides profile as described above.

The degree of conversion of the partially rearranged fat sample is calculated as follows:

For each carbon number in the range 30-60 the differences are calculated between the mole fraction at the beginning of the reaction and the mole fraction at full sn-1 and sn-3 randomisation (equilibrium). The sum of the (absolute) values of these differences (100% absolute change of carbon numbers) defines 100% rearrangement of the fat blend.

In the same way for a specific sample taken from a reaction mixture for each carbon number between 30 to 60 the differences are calculated of the mole fraction at the begin of the reaction and the actual mole fraction when sampling the reaction product. Again the absolute values of these differences are accumulated. The sum is the actual absolute change of carbon numbers until the moment of sampling.

For the specific sample the conversion degree Re=(actual absolute change of carbon numbers)/(100% absolute change of carbon numbers).

This equation applies for triglyceride products where the abovementioned 100% absolute change of carbon numbers is at least 0.15. If not, the degree of conversion Re should be determined in an alternative way:

For each triacylglyceride of the type H3, H2O and H2L (where H indicates fatty acid residues of palmitic or stearic acid, O of oleic acid and L of linoleic acid) the mole fraction is established by analysis. For each of these triglycerides the absolute change between the molar fraction at the beginning of the reaction and at full sn-1 and sn-3 randomisation is calculated. The sum of the absolute values of these changes belongs to the state of 100% conversion.

For a specific sample taken during the proceeding reaction the difference between the mole fraction at the begin of the reaction and at the actual state of the reaction product is calculated for the same selected triglycerides. The absolute values of the differences in mole fraction are accumulated. The sum defines 100% rearrangement of the fat blend.

The degree of conversion Re of the specific sample follows from the equation:

$Re = $ (actual change of triacylglycerides)/(100% absolute change of triacylglycerides).

Determination of Ra, the degree of rearrangement at the middle position, proceeds as follows:

For the initial feedstock and for a sample taken from the reaction mixture first the total occurrence of fatty acid residues and the occurrence of fatty acid residues situated at the 2-position of the triacylglyceride is established using GLC-FAME and 2-position analysis. For methods see the references described above.

For each fatty acid occurring in the triacylglyceride fat at a molar level of at least 0.002 the absolute difference of its Sn-2 molar fraction at the beginning of the reaction and its molar fraction in the reaction mixture is calculated, wherein the latter mixture is equal to chemically randomised fat. The sum of the absolute values of these changes (Fa–Sn2–100%) for all selected fatty acids defines the status of 100% degree of Sn-2 randomness.

For a sample taken during the proceeding reaction in the same way the absolute change between the Sn-2 molar fraction at the begin of the reaction and at the actual state of the reaction product is calculated for each of the selected fatty acids. The sum of the absolute values of these changes (Fa–Sn2–actual) is the actual absolute change of fatty acids on the Sn-2 position.

For the specific sample the Ra value follows from the equation:

$Ra = (Fa\text{-}Sn2\text{-}actual)/(Fa\text{-}Sn2\text{-}100\%)$

EXAMPLE 1

60 g of palm oil and 40 g of palm kernel oil were mixed together in a 100 ml reaction vessel and heated to 70° C. 1 wt. % of Lipozyme® TL IM (activity 455 IUN, 38 g/(g*h)) was added to the mixture and this was stirred at 70° C. Samples were taken at intervals and the degree of conversion Re and the degree of conversion Ra were determined according to the methods described elsewhere in this specification by means of establishing changes in carbon number distribution and changes in composition of fatty acids on the middle position.

At the conversion degrees Re of 0.85 and 0.5, the following degrees of rearrangement of the middle position have been found:

TABLE I

| Degree of conversion Re | Degree of conversion Ra |
|---|---|
| 0.85 | 0.28 |
| 0.5 | 0.1 |

EXAMPLE 2

Example 1 has been repeated but using a low activity Lipozyme® TL IM lipase catalyst and the 10% catalyst concentration as used in the prior art.

EXAMPLE 3

Example 1 has been repeated using the same high activity Lipozyme® TL IM catalyst, but with the same high catalyst concentration as used in comparison example 2, allowing a contact time which is much shorter than necessary in examples 1 and 2.

TABLE II

| ER using Lipozyme ® TL IM catalyst | Example 1 | Example 2 | Example 3 |
|---|---|---|---|
| Catalyst conc. (wt. %) | 1 | 10 | 10 |
| Water (wt. %) | 0.013 | 0.025 | 0.024 |
| Reaction time (h) | 5.25 | 2.75 | 0.60 |
| Activity (IUN) | 455 | 160 | 455 |
| Activity g/(g * h) | 38 | 18 | 38 |
| Conversion Re | 0.85 | 0.85 | 0.85 |
| Randomness Ra | 0.28 | 0.08 | 0.21 |
| Ra > 0.32Re − 0.08 | yes | no | yes |
| Ra > 0.32Re − 0.06 | yes | no | equal |
| Ra > 0.32Re − 0.04 | yes | no | no |

The high activity Lipozyme® TL IM catalyst (example 1) causes at a low concentration the same conversion Re as the prior art low activity catalyst of example 2 but accompanied by a high rearrangement of the middle composition. When increasing the catalyst concentration according to example 3 the same effect as example 1 is obtained with a shorter contact time, which enables a higher throughput.

EXAMPLES 4-6

Examples 1-3 have been repeated under the same conditions, respectively, but using shorter contact times. The shorter contact times result in a lower degree of conversion Re, but even at these lower conversion degrees the same relatively high rearrangement on the middle position is observed.

TABLE III

| ER using Lipozyme ® TL IM catalyst | Example 4 | Example 5 | Example 6 |
|---|---|---|---|
| Catalyst conc. (wt. %) | 1 | 10 | 10 |
| Water (wt. %) | 0.013 | 0.025 | 0.024 |
| Activity (IUN) | 455 | 160 | 455 |
| Activity g/(g * h) | 38 | 18 | 38 |
| Conversion Re | 0.4 | 0.4 | 0.4 |
| Randomness Ra | 0.08 | 0.02 | 0.08 |
| Ra > 0.32Re − 0.08 | yes | no | yes |
| Ra > 0.32Re − 0.06 | yes | no | yes |
| Ra > 0.32Re − 0.04 | no | no | no |

EXAMPLE 7

Graininess in Spreads

Hardstock A was prepared by the following method: 50 wt % of palm oil and 50 wt % of palm kernel oil were mixed together in a reaction vessel and 0.53 wt % of Lipozyme® TL IM (activity 38 g/(g*h)) was added to the mixture. This was stirred at 70° C. until a conversion Re was reached of 0.63. Rearrangement of the sn-2 position Ra was determined as being 0.18.

A fatblend was prepared from the following:
42 wt % hardstock A
5 wt % of interesterified dry fractionated palm oil stearin (62 wt %) with palm kernel oil (38 wt %)
53 wt % rapeseed oil A fat phase was prepared by mixing 99.7 parts of fatblend, 0.2 parts of lecithin and 0.1 parts of monoglyceride (Hymono 8903). An aqueous phase was prepared from 96.3 parts water, 2.2 parts sour whey powder and 1.5 parts salt. The pH was adjusted to 4.6 by means of addition of citric acid.

80 parts fat phase and 20 parts aqueous phase were combined and processed in a conventional manner using a votator, to obtain a spread which is packed in tubs. The spreads were produced using an AAC sequence. The temperature after the second A-unit was 8° C. and after the C-unit was 16° C. The A-units were operated at 600 rpm and the C-unit at 230 rpm. The residence time in the C-unit was approximately 90 sec. The product was stored at 5° C. for 5 weeks.

For comparison, margarines were made using a fatblend in which:

i. Hardstock B (Re 0.62, Ra 0.10) was used, which was prepared with Lipozyme® TM IM of activity 18 g/(g*h)
ii. Hardstock C (Re 0.60, Ra 0.05) was used which was prepared with Lipase D (Rhizopus oryzae on Accurel carrier).

Everything else was kept the same.

An expert panel judged the products for the presence of tropical grains.

In margarines which had been made with hardstock A, grains were scarce and barely noticeable.

In margarines which had been made with hardstock B, grains were apparent at unacceptable levels creating an intolerable product defect.

In margarines which had been made with hardstock C, grains were clearly abundant throughout the product and thus a clear unacceptable defect.

TABLE IV

| | Enzyme catalyst | | |
|---|---|---|---|
| | Lipozyme® TL IM (hardstock A) | Lipozyme® TL IM (hardstock B) | Lipase D (hardstock C) |
| Activity (g/(g*h)) | 38 | 18 | 53 |
| IUN | 455 | 160 | — |
| Concentration wt % | 0.53 | 1.03 | 0.34 |
| Re | 0.63 | 0.62 | 0.60 |
| Ra | 0.18 | 0.10 | 0.05 |
| Presence of grains in final product | Scarce, acceptable | Numerous, unacceptable | Abundant, unacceptable |

In the product made with the process of the present invention hardstock A, where Ra is highest, no or hardly any tropical grains were detected. On the contrary, products made with either a low activity (hardstock B) or a sn-1 and sn-3 specific lipase (hardstock C) give rise to unacceptable levels of tropical grains.

EXAMPLE 8

Graininess 60 wt % of palm oil and 40 wt % of palm kernel oil were mixed together in a reaction vessel and 0.9 wt % of Lipozyme® TL IM (activity 455 IUN, 38 g/(g*h)) was added to the mixture. This was stirred at 70° C. to give hardstock A with Re 0.68. Ra was determined to be 0.22. Hardstock B was made with Re 0.26 and Ra 0.08 and 0.6 wt % Lipozyme® TL IM (activity 455 IUN, 38 g/(g*h)).

A fatblend was prepared from the following:
42 wt % hardstock A
5 wt % interesterified palm stearin with palm kernel oil
53 wt % rapeseed oil A fat phase was prepared by mixing 0.9971 parts of fatblend, 0.0020 parts of lecithin and 0.0009 parts of monoglyceride. An aqueous phase was prepared from 0.9630 parts water, 0.0220 parts sour whey powder and 0.0150 parts salt and citric acid to a pH of 3.8.

80 parts fat phase and 20 parts aqueous phase were combined and processed in a conventional manner using a votator, to obtain a spread which is packed in tubs. The spreads were produced using an ACAA sequence. The temperature after the first A-unit was 15° C., after the C-unit was 18° C. and after the last A unit was 10° C. The A-units were operated at 600 rpm and the C-unit at 200 rpm. The residence time in the C-unit was approximately 90 sec. The product was stored at 5° C. for 5 weeks. No tropical grains developed in the product.

For comparison, margarines were made using a fatblend in which Hardstock B was used.

In products in which hardstock A was used, no tropical grains had developed.

In products in which hardstocks B were used, tropical grains were identified after 5 weeks of storage at 5° C.

TABLE V

| | Hardstock | |
|---|---|---|
| | A | B |
| Activity IUN | 455 | 455 |
| g/(g*h) | 38 | 38 |
| Re | 0.68 | 0.26 |
| Ra | 0.22 | 0.08 |
| Tropical grains | No | Yes |

EXAMPLE 9

Ra Vs Reaction Time

Following the same procedure as outlined in example 1, four experiments in a batch reactor were performed. In table IV the type of enzyme, its activity, and its concentration in the reactor are given.

TABLE VI

| experiment | Lipase | Concentration (w/w) % | Activity g/g/h |
|---|---|---|---|
| 1 | Lipozyme® TL IM | 2.4 | 38 |
| 2 | Lipozyme® TL IM | 10 | 38 |
| 3 comparative | Lipozyme® TL IM | 10 | 18 |
| 4 comparative | Lipase D | 10 | 53 |

Figure 3:
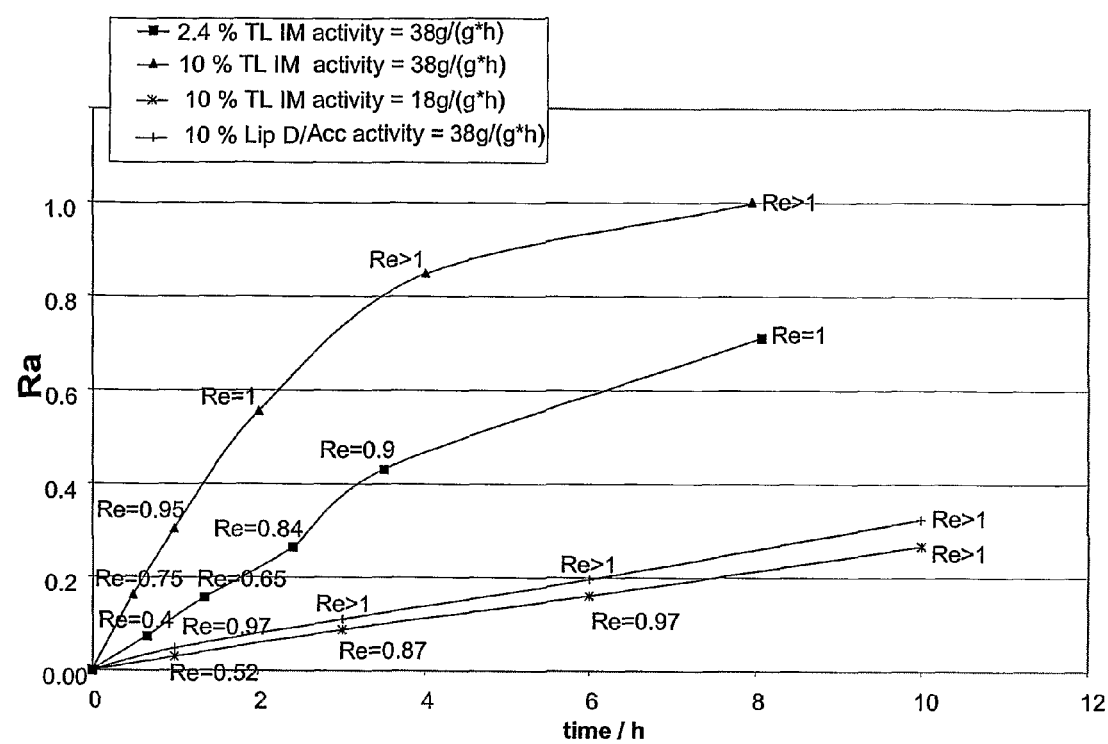
FIG. 3: Plot of randomisation on 2-position (Ra) versus time Re>1 indicates that the reaction time has exceeded the time needed to reach equilibrium with respect to the randomisation of the sn-1 and sn-3 positions.

The reaction mixture again consists of 60 parts palm oil and 40 parts palm kernel fat. The four reactions were monitored closely over time. A number of samples were taken and analysed. The last sample was taken after 10 hours reaction time. From the analytical data the degree of conversion (Re) and the randomisation of the sn-2 position (Ra) were derived as outlined in the text. FIG. 3 illustrates the evolution of Re and Ra over time for the different reactions.

The graph clearly shows, that for the Lipase D (experiment 4) and the low activity Lipozyme® TL IM (experiment 3) the small changes in the composition of the sn-2 position are progressing linear with time. This is in line with the prior art stating the effect of acyl migration in partial fatty acid glycerides (see Torres et al., JAOCS vol 79, no. 8 (2002) p 775-

781, Torres et al JOACS, vol 79 no 7 (2002) p 655-661, and Zhang et al JAOCS vol 78, no. 1 (2001) p 57-64).

In contrast to this, Lipozyme® TL IM with a high activity and a concentration level of 10 (w/w) % (experiment 2) yields a dramatically increased randomisation of the sn-2 position at the same reaction time.

It should be pointed out that in comparison to the experiment 4 (lipase D) these timings are actually corresponding to practically identical degrees of conversion with respect to the randomisation of the sn-1 and sn-3 positions (Re). The different shapes of the curves also illustrate this.

Also experiment 1, with a lower Lipozyme® TL IM concentration shows a clearly different behaviour than the comparative experiments (3 and 4). When comparing the experiments 1 and 2 one finds that for a given degree of conversion (the randomisation of the sn-1 and sn-3 positions (Re)) the experiment employing a low concentration of the enzyme catalyst actually yields higher degrees of randomisation of the sn-2 position (Ra). This increase in Ra is coinciding with the presence of less silica in the reaction vessel.

As this example clearly demonstrates, the process we have found is substantially different from the processes reported in the prior art.

EXAMPLE 10

RA vs contact time 60 parts of palm oil is mixed well with 40 parts of palm kernel oil at 70° C. and added to the feed tank of a packed bed reactor (PBR) system, of which the temperature is also 70° C.

A PBR of 20 ml volume is filled with 3 g of Lipozyme® TL IM (Activity IUN 455, 38 g/(g*h)) to give a catalyst bed volume of 7 ml.

The flow meter, controlling the oil flow through the reactor is set to 35 g/h, which corresponds to a residence time of around 8 minutes, in order to achieve an Re of approximately 0.6. Samples are taken at regular intervals and the flow adjusted accordingly in order to compensate for the deactivation of the enzyme and thus retain an Re of 0.6.

TABLE VII

| Relative activity (%) | Re | Ra | Flow (g/h) | Residence time (min) |
| --- | --- | --- | --- | --- |
| 100 | 0.58 | 0.15 | 35 | 8 |
| 42 | 0.63 | 0.15 | 13 | 22 |
| 32 | 0.62 | 0.14 | 10 | 28 |
| 9 | 0.64 | 0.12 | 3 | 105 |

In the same way, a second experiment was carried out whereby the flow was set to 20 g/h, which corresponds to a residence time of 14 minutes, in order to achieve a Re of approximately 0.8.

TABLE VIII

| Relative activity (%) | Re | Ra | Flow (g/h) | Residence time (min) |
| --- | --- | --- | --- | --- |
| 100 | 0.84 | 0.30 | 20 | 14 |
| 77 | 0.83 | 0.29 | 16 | 17 |
| 47 | 0.83 | 0.27 | 10 | 28 |
| 8 | 0.84 | 0.25 | 2 | 165 |

The results documented in the tables VII and VIII above, illustrate that in order to maintain a constant degree of conversion over time in a packed bed flow reactor, it is necessary to adjust the flow rate in a reciprocal way to the deactivation of the enzyme catalyst (reduction of activity). To our surprise, we have found that the resulting randomisation of the sn-2 position (Ra) is practically not affected by these dramatically increased residence times, from 14 to 165 minutes. If the found randomisation would be the result of the often-cited acyl migration in partial fatty acid glycerides, the sn-2 randomisation (Ra) should increase dramatically with increasing residence time. The process according to the invention, however, yields that the sn-2 randomisation (Ra) is practically constant when the residence time is increased.

The data also show that the sn-2 randomisation (Ra) is not changing when an enzyme catalyst with high starting activity, according to the invention, is as a consequence of the ongoing process functioning at a reduced activity. This proves that the high starting activity of the enzyme catalyst, as defined in the text, is the key element to the establishment of the sn-2 randomisation (Ra).

The invention claimed is:

1. An enzymatic rearrangement process for randomizing fatty acid residues on a triglyceride fat over the terminal and middle positions, said process comprising exposing the triglyceride fat in a reaction mixture which has a water content of 0.001 to 0.1 wt % to a catalyst comprising *Thermomyces lanuginosa* lipase having an activity of at least 250 IUN at the onset of the process, wherein the process proceeds to a conversion degree on the terminal positions, Re, ranging from 0.3 to less than 0.9, wherein a conversion degree on the middle position, Ra, ranges from 0.06-0.75, and wherein the conversion degree on the middle position, Ra is greater than a value given by 0.32Re-0.08.

2. The process according to claim 1, characterised in that the catalyst has an activity of at least 300 IUN.

3. The process according to claim 1, characterised in that Ra is greater than 0.32Re-0.06.

4. The process according to claim 1, characterised in that the amount of catalyst used when the exposure step of the process is carried out in a batch reactor is 0.05-9 wt. % calculated on the reaction mixture.

5. The process according to claim 1, wherein the exposure step of the process is carried out by passing the reaction mixture through a packed catalyst bed reactor, wherein the catalyst comprises *Thermomyces lanuginosa*, and wherein in the first hour of passage of the reaction mixture through the packed catalyst bed reactor, the reaction mixture has a residence time in the packed catalyst bed reactor of less than 25 min.

6. The process according to claim 1, characterised in that the triglyceride fat is selected from the list comprising any mixture comprising a liquid oil and a hydrogenated oil, any triglyceride fat which has not been subjected to hydrogenation, and a mixture of palm fat or a palm fat fraction and a lauric fat or a lauric fat fraction.

7. The process according to claim 1, characterised in that the conversion degree Re is less than 0.85.

8. The process according to claim 1, characterised in that the conversion degree Re is at least 0.35.

9. The process according to claim 1, characterised in that the content of water in the reaction mixture is from 0.001 to 0.05 wt. %.

10. The process according to claim 1, wherein the reaction mixture has a temperature from 40 to 85° C.

11. The process according to claim 1, wherein the catalyst has an activity of at least 350 IUN.

12. The process according to claim 1, wherein Ra is greater than 0.32Re-0.04.

13. The process according to claim 1, wherein the amount of catalyst used when the process is carried out in a batch reactor is 0.05-3 wt. % based on the weight of reaction mixture.

14. The process according to claim 1, wherein the process of exposing the triglyceride fat in a reaction mixture to the catalyst is carried out by passing the reaction mixture through a packed catalyst bed reactor, wherein the catalyst comprises *Thermomyces lanuginosa* and wherein in the first hour of passage of the reaction mixture through the packed catalyst bed reactor, the reaction mixture has a residence time in the packed catalyst bed reactor of less than 15 min.

15. The process according to claim 1, wherein the conversion degree Re is at least 0.4 and less than 0.85.

16. The process according claim 1, wherein the reaction mixture has a temperature of from 50 to 75° C.

* * * * *